March 10, 1953     A. J. HIGGINS     2,630,733
GRIP-NUT FOR SHEET METAL FASTENING SCREWS
Filed Nov. 8, 1949
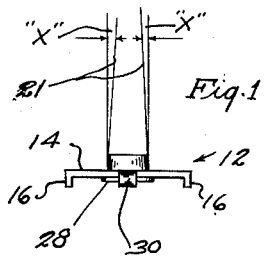
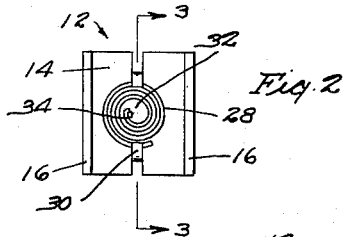
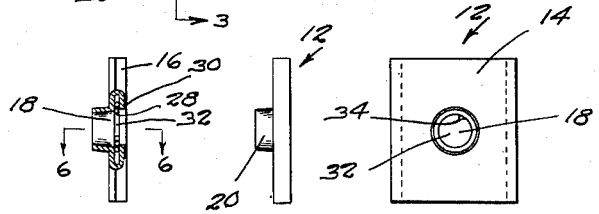
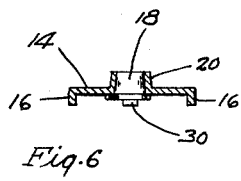
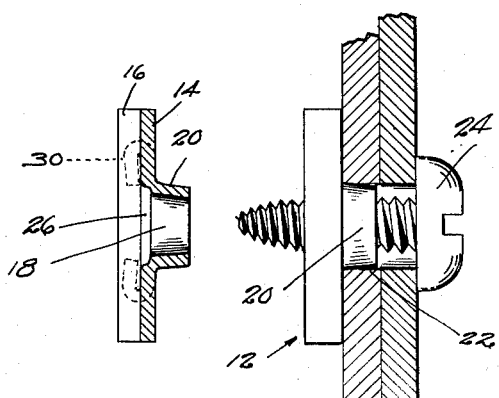
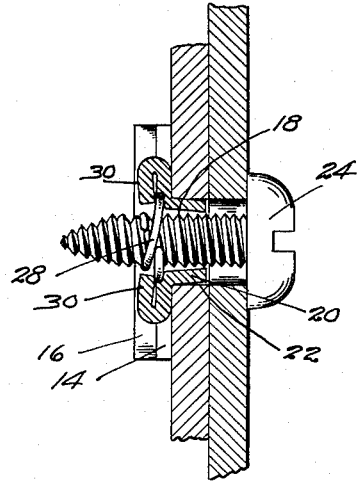
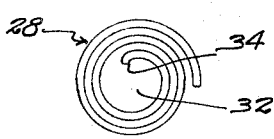
INVENTOR.
Anthony J. Higgins
BY Patented Mar. 10, 1953

2,630,733

UNITED STATES PATENT OFFICE 2,630,733

GRIP-NUT FOR SHEET METAL FASTENING SCREWS

Anthony J. Higgins, Pasadena, Calif.

Application November 8, 1949, Serial No. 126,168

5 Claims. (Cl. 85—36)

The present invention relates to grip nuts for screws used to hold two or more pieces of sheet metal in functional position, and finds its application in many industries using sheet metal in the fabrication of numerous items of consumer goods and other goods, such as, stoves, refrigerators, furniture, automobiles, aircraft, et cetera, in fact in any assembly joined by screws wherein it is difficult to manually hold a nut in position for application upon a screw; and, In view thereof, it is a prime object of the invention to provide a new and improved grip nut for use in conjunction with sheet metal and other assemblies.

A further object of the invention is to provide a grip nut which offers a minimum resistance in application to work and a maximum resistance to reverse movement of a screw.

A still further object of the invention is the provision of a grip nut having the afore-mentioned characteristics, which is susceptible of repeated application without notable loss of gripping efficiency.

A still further object of the invention is the provision of a grip nut having each of the aforementioned characteristics, and having means which are self-centering and self-retaining in and with respect to a screw hole in the work.

A still further object of the invention is to provide a grip nut having a spiral spring fixedly centered upon the screw opening of the nut, the convolutions of the spring being directed oppositely from the lead of the thread of the screw whereby upon advancing the screw the convolutions of the spring tend to be unwound and whereby upon reverse rotation of the screw the convolutions of the spring grip the screw under an increasing degree of tension.

A still further object of the invention is to provide a grip nut having a spiral spring affixed to the body thereof and having its convolutions centered upon a screw opening in the nut, the convolutions of the spring being so positioned and arranged as to be spreadable to receive an advancing screw and to be constricting upon the screw when reversely rotated whereby the screw is restrained from disengagement therewith.

Still another object of the invention is to provide a grip nut having a spiral spring secured upon one of the sides thereof for screw gripping purposes and having a tapered neck upon the other of the sides thereof for insertion in a drill hole in the work whereby upon insertion thereof in a preformed screw opening or hole in the work, the nut is self-centered and supported in relationship thereto against gravitational dislodgement.

Other objects of the invention, as well as features and advantages thereof may be noted from a study of the accompanying detailed description, the drawing, and the sub-joined claims.

In the drawing:

Figure 1 is an end view of the grip nut of this invention; and,

Figure 2 is an elevational view of the back of the nut showing the pancake spring in functional position.

Figure 3 is a sectional view as seen along line 3—3, in Figure 2.

Figure 4 is a side view of the nut; and,

Figure 5 is a front elevational view of the nut.

Figure 6 is a transverse sectional view as seen alnog line 6—6, Figure 3.

Figure 7 is a transverse sectional view through two sheets of metal showing a screw with a nut thereon in application to the work as represented by the sheets of metal; and, Figure 8 is a view generally analogous to Figure 7, except that here the grip nut is shown in section to better illustrate the manner in which the pancake spring engages the advanced screw, counter-clockwise rotation of the screw would cause the spring to constrictingly engage the screw under an increasing degree of tension.

Figure 9 is a sectional view as seen along line 3—3 in Figure 2 of the grip nut body before the spring is mounted.

Figure 10 is a side-elevational view of the pancake spring detached from the body of the nut, the spring is here positioned to receive the advance of a screw being applied to the work and when so advanced tends to unwind or spread the convolution of the spring, reverse movement of a screw tightens the convolutions of the spring upon the screw.

Reference to the drawing will show that the grip nut 12 of this invention is formed with a flat body portion 14 having up-turned sides 16 for strengthening against tension when applied in functional use. The guage of the metal comprising the body of the nut, as well as the dimensions thereof, including the depth of the up-turned sides 16 is of course proportional to the required duty.

The center of the body 14 is pierced to form a screw opening 18 and the material displaced in forming the opening 18 is extruded to form a tubular neck 20 the sides of which are convergingly inclined toward the medial longitudinal center thereof as indicated at 21 in Figure 1. The degree of the converging angularity is generally indicated at "X" without being specific, however, the degree of acuteness of the angular inclination is such as will provide a definite wedging action when inserted in the work as shown in Figures 7 and 8, so that when the extruded tubular neck 20 is inserted in a preformed screw opening 22 it will remain lodged therein against gravitational dislodgement and other minor cause of displacement including the nudging thrust of a screw 24 when being functionally applied thereto.

The back of the body portion 14 is provided with an annular recess 26 which is concentric with and is contiguous with the opening 18, and is adapted to form a seat for a pancake spring 28 which is held therein by means of tabs 30 which are struck from the body of the nut, so that the central opening 32 of the spring is as concentric as may be with the medial longitudinal center of the opening 18.

The guage of the material comprising the spring should be such as to permit the inner turn of the spring to rest or be seated in a substantial manner within the groove formed by the threads of the screw, and the diameter of the innermost convolution of the spring should be such as to permit the entry of a plural number of threads upon the tip of the screw before noticeable expansion thereof takes place, thereby enabling the nib 34 and its associated spring convolution to accommodate itself to the best seating position among the threads of the screw.

The pancake spring may be formed with two or more convolutions, but I find that two to three complete turns are sufficient to provide an amount of elasticity for expansion or unwinding to permit easy entry of a screw when applied to a nut, and to constrictingly carry over and around the screw when reversely rotated whereby the screw is gripped in a progressively tighter band as the screw is counter-rotated, but regardless of the number of convolutions formed in the spring, I form the nib 34 upon the free end of the innermost spring convolution, and this nib serves as a pilot to facilitate engagement with the threads of the screw when being applied to the work.

It is believed it will be apparent from the preceding description that I have created a novel grip nut, a nut which is particularly adapted to use in sheet metal fabrications, and particularly in those assemblies wherein because of space limitations it is very difficult to manually apply a standard nut upon a screw or bolt for the reason that as the neck 20 is rotatingly thrust into the drill hole 22, the burred edge thereof will bite into the exterior surface of the extruded neck and firmly hold it in place, so that in practice the nut may be applied to the detached pieces of the work before assembly on the floor, bench or jig, and it will remain so positioned when handled with ordinary care, and in addition to this feature and of equal or greater importance is the action of the spring 28 in the assembly comprising the nut as an entity, for it will be noted that the convolutions of the spring are formed in such manner as to expand when driving a screw, and hence offers but negligible resistance thereto, but upon counter-rotation of the screw, the convolutions of the spring will tighten themselves around the spring in a constricting grip which builds to a maximum pressure sufficient to hold the screw in functional position against all but deliberate manual removal thereof. It is also to be noted that the grip nut herein shown and described is capable of repeated use for there is no structural element involved which is deformed by compression, ruptured or otherwise harmed by successive uses, nor is the nut deteriorated or otherwise harmed by heat, and within the tolerance of the metals used in constructing the nut, it is not subject to corrosion.

Having thus described my new and improved grip nut in its presently preferred form, that which I desire to protect by Letters Patent, is as follows:

1. A sheet metal fastening device, said device comprising a body having a horizontal face portion formed with slits in the edge of a pair of oppositely disposed edges thereof so as to define tabs therein and being formed with a medially disposed aperture extending therethrough, a spring, said spring being of coiled pancake form having an inner convolution diameter smaller than the diameter of said aperture and medially disposed around said aperture and being secured in functional use position upon the body of said device by inturning and depressing said tabs upon oppositely located sides of the outer coil thereof.

2. A sheet metal screw fastening device, said device being formed of rectangular sheet metal stock having a central horizontal face formed with oppositely disposed tabs in the edges thereof and being apertured medially thereof, a depressed annular seat upon one face of said device concentric with said aperture, a pancake type coil spring adapted to have its outer convolution rest upon said annular seat, said aperture having a greater diameter than the diameter of the inner convolution of said pancake spring, said pancake type spring being secured in said depressed seat by inturning and depressing said tabs on the outermost convolution thereof whereby the inner coil of the spring is free for extension outwardly of a plane coincidental with the top surface of the outer convolution of said spring.

3. The combination with a sheet metal screw, of a nut therefor, said nut comprising a piece of rectangular sheet metal stock having a horizontal face portion apertured medially therethrough and having two unidirectional flanged sides, a tab struck from each of the remaining sides of said nut, a pancake type spring, a seat for said spring, said seat being depressed in said nut and being medially disposed around said aperture and being so formed that the depressed sides thereof form a shoulder adapted to hold said spring against drift, the diameter of said aperture being greater than the diameter of the innermost convolution of said spring so as to facilitate adjustment of a sheet metal screw with respect to said spring, said spring being secured in said seat by inturning and depressing said tabs upon the outer convolution of said spring so as to enable the inner convolution thereof to be extended outwardly of the face portion of the nut upon insertion of a screw therethrough.

4. In combination with a screw having a tapered nib comprising the leading end thereof, a nut for said screw, said nut having a body comprising a single piece of flat sheet metal stock partially slitted upon two sides so as to define a pair of oppositely located tongues and being further formed with a non-threaded aperture extending therethrough, a pancake spring upon the outer face of the nut, the diameter of the aperture through said nut and the diameter of the innermost convolutions of said spring being of unequal value wherein the diameter of said aperture is the greater thereof, said spring being formed with a pilot nib on its inner coil and being centered with respect to the medial transverse axis of said aperture and being secured in functional use position by in-turning said tongues upon the outer convolution thereof, said spring being so arranged as to become of elongato-conical form upon clock-wise rotation of said screw entering therein through said aperture and being adapted to constrictingly bind upon the screw upon counter-rotation thereof.

5. In a nut of the class wherein a body is formed of a thin flat piece of sheet metal having an aperture formed medially therethrough and wherein securing tabs are formed upon the ends of the body by slotting and infolding upon a face of said body the material defined by said slots, the combination with said body of a pancake type extensile spring comprising a number of spiral convolutions of material wherein the outer most convolution is anchored upon said face of the body of the nut by said infolded tabs and wherein the inner most convolution terminates in a nib adapted to pilot said inner most spring convolution along the threads of a screw inserted through said aperture and rotated through the inner most convolution of the spring whereby lateral extension thereof from said face on said body longitudinally of the medial axis of the spring is had by screw thread pressure, said aperture and said inner most spring convolution being differentiated in diametrical value in favor of said aperture.

ANTHONY J. HIGGINS.

REFERENCES CITED

The following references are of record in the file of this patent:

UNITED STATES PATENTS

| Number | Name | Date |
| --- | --- | --- |
| 786,664 | McCullough | Apr. 4, 1905 |
| 1,104,731 | Heimar | July 21, 1914 |
| 1,264,677 | Murrell | Apr. 30, 1918 |
| 1,326,992 | Thibert | Jan. 6, 1920 |
| 1,714,520 | Sande | May 28, 1929 |
| 2,026,757 | Swanstrom | Jan. 7, 1936 |
| 2,381,936 | Sargent | Aug. 14, 1945 |
| 2,421,905 | Perry | June 20, 1947 |
| 2,429,833 | Luce | Aug. 28, 1947 |
| 2,544,304 | Eckenbeck | Mar. 6, 1951 |